Figure 1:
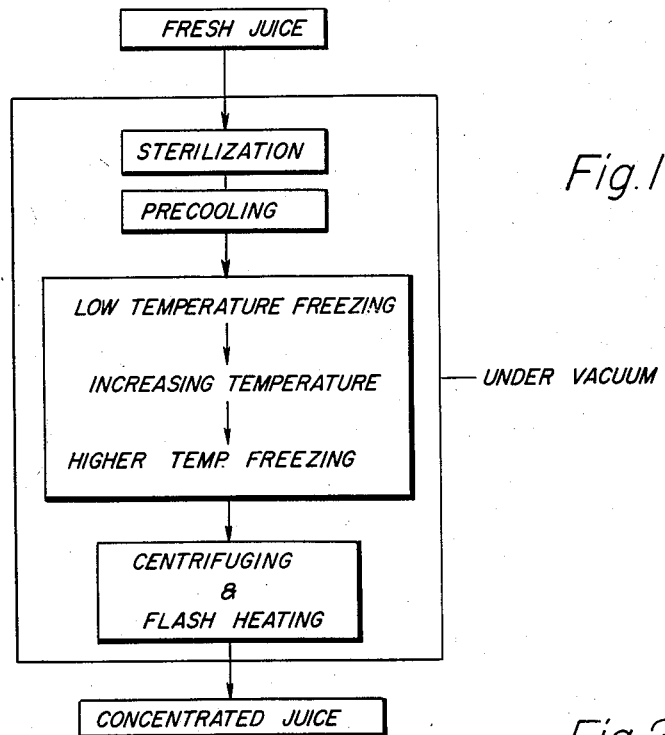

Dec. 29, 1959    H. A. TOULMIN, JR    2,919,199
PROCESS OF VACUUM LOW TEMPERATURE DEHYDRATION
Filed July 25, 1955

INVENTOR
HARRY A. TOULMIN, JR.
BY
ATTORNEYS

United States Patent Office 2,919,199
Patented Dec. 29, 1959

2,919,199

PROCESS OF VACUUM LOW TEMPERATURE DEHYDRATION

Harry A. Toulmin, Jr., Dayton, Ohio, assignor, by mesne assignments, to Union Carbide Corporation, New York, N.Y., a corporation of New York Application July 25, 1955, Serial No. 524,068

4 Claims. (Cl. 99—205)

The present invention relates to the concentration of heat-sensitive liquids containing solids, more particularly, to a method of low temperature dehydration wherein the liquid is initially subjected to a marked and abrupt drop in temperature and the temperature of the liquid is subsequently progressively increased.

While the method of this invention is particularly adapted for the dehydration of citrus juices and the like, other products to which this method may be applied are fruit juices, beer, wines, pharmaceuticals such as antibiotics, coffee, milk and vegetable juices. This list is not exclusive but serves to exemplify the products which may be dehydrated by the process of this invention.

The principal field in which concentration by dehydration has been utilized is in the citrus juice industry. By removing a major portion of the water from citrus juices the concentrated juices may be packaged and disseminated to consumers. It is only necessary that the consumer add water to the concentrate to reconstitute the juice. Consequently, it is the prime objective of fruit juice concentration processes that only pure water be removed. This will result in a reconstituted juice that has the same taste and other characteristics inherent in the fresh juice.

In one method of dehydrating juices the fresh juice is subjected to a plurality of freezing steps, each one of which is maintained several degrees lower than the preceding step. By carefully controlling the temperature differential between the freezing steps and agitating the juices during each freezing step, the water is removed in the form of fine ice crystals.

The resulting juice concentrate obtained from this process is satisfactory. However, since the batch of juice must be recirculated through each of the freezing steps, it can be seen that the total time of processing juice in this manner is considerable, being dependent in part on the size of the batch.

The commercial success of this method of dehydration, as explained above, has not precluded investigation of improved low-temperature dehydration processes.

The objective in investigating improved processes is a dual one and essentially comprises reducing the time duration of the process while obtaining a juice concentrate wherein only pure water is removed. The danger of more rapid freezing processes largely lies in the occlusion of air, solids and aromatics within the ice crystals. The occlusion of these substances in the ice crystals results in white ice which also has a tendency to clog the mechanism of the freezing apparatus. Since the presence of white ice indicates the degree of entrainment of solids, gaseous matter and juices, it is readily apparent that a satisfactory freezing process should eliminate the formation of any white ice.

Consequently, the ideal low temperature dehydration process would form pure ice crystals composed of only water with no occlusion of aromatics, air or solids therein. The juice concentrate would then be reconstituted merely by the addition of water by the user.

The present invention discloses an improved method of low temperature dehydration of fruit juices or the like. In this method the fresh juice is suddenly subjected to a temperature drop to about −30° F. The temperature is then progressively increased in substantially equal increments. Ice crystals are removed prior to each temperature increase and after the final temperature increase. This method of freezing is termed "thermal shock freezing" or "shock freezing."

By immediately subjecting the juice to a sudden and marked drop in temperature, maximum water removal will occur when the juice has maximum water content. By vigorously agitating the juice when it is subjected to the low temperature, the solids and other juice particles will be prevented from being occluded within the ice crystals. In addition, the entire freezing process is carried out optionally under a low vacuum to prevent volatilization of aromatics from the juice and the entrainment of air within the ice crystals.

The result of the shock freezing process of this invention is a concentrated juice with nothing but the water removed. Furthermore, the complete freezing process consumes a smaller amount of time as compared to the conventional dehydration processes since the maximum water is extracted when the juice is initially subjected to a low temperature.

It is therefore the principal object of this invention to provide an improved method of dehydration by freezing of the solvent of solutions and/or of suspensions.

It is another object of this invention to provide a method of dehydration of materials comprising water and solids by freezing wherein the maximum size ice crystals are formed under conditions when the maximum amount of water is present in the material.

It is an additional object of this invention to provide a method of dehydration of heat-sensitive liquids containing solids by freezing wherein the concentration of the liquid rises with increasing temperatures during the freezing process.

It is a further object of this invention to provide a method of dehydrating of heat-sensitive liquids by freezing wherein the size of the ice crystals decreases as the temperature of the liquid increases to extract the maximum amount of water from the liquid.

It is still another object of this invention to provide a method of dehydration of liquids by freezing wherein the liquid is continuously maintained under vacuum while it is initially subjected to a sudden drop in temperature, and the temperature increased to increase the concentration of the juice.

Figure 2:
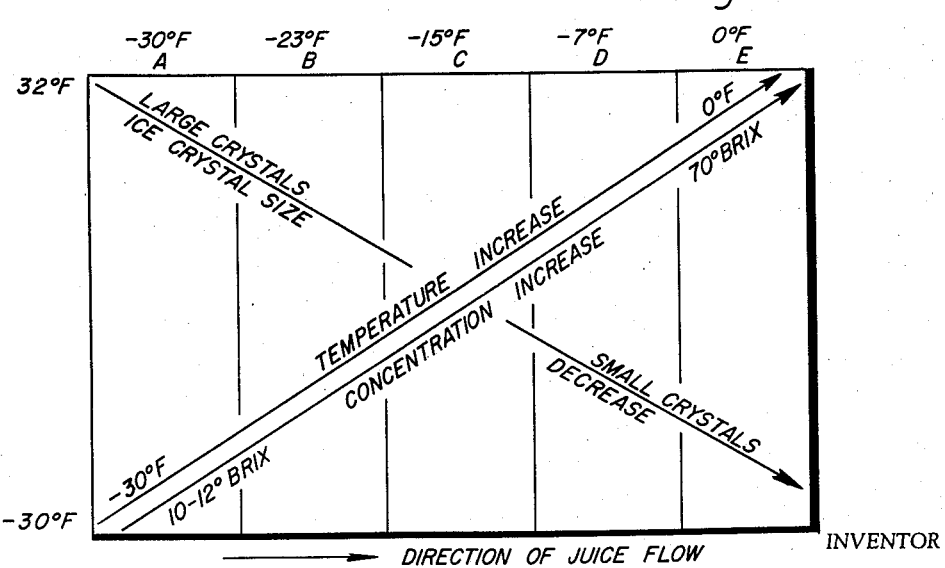

Comprehension of the process of this invention will be facilitated by reference to the accompanying drawings wherein:

Figure 1 is a flow sheet showing the coordinated steps of the process of this invention; and Figure 2 is a graph schematically illustrating the function of the ice crystal size, temperature increase, concentration increase during the process.

It will be observed that the process of this invention is initiated by sterilizing the fresh juice. This sterilization may be accomplished by subjecting the juice to ultra-violet light having a wave length of the order of 2900 Angstrom units.

The sterilized juice is next pre-cooled to a temperature of 32–33° F. or immediately above the freezing point of water at atmospheric pressure. Since the fresh juice is at room temperature, or about 70° F., the temperature is easily lowered. This pre-cooling will condition the juice to the sudden drop in temperature which subsequently follows.

The sterilized and pre-cooled juice is then subjected to a sudden temperature drop to a temperature of about —30° F. Simultaneously, there is a vigorous agitation of this cooled juice. The vigorous agitation is necessary to prevent the formation of large chunks of ice in the liquid, which chunks would have occluded therein air, solids and other particles of the juice. The degree of the vigorous agitation is substantially inversely proportional to the temperature to which the juice is subjected.

When the fresh juice commences the freezing process the juice has a maximum water content therein. The initial subjection of the juice to the low temperature will result in maximum size crystals which will remove the major portion of the water within the juice. The crystals formed will be elongated and substantially needle-like in structure with a very fine diameter. Consequently, it may be seen that the juice is subjected to temperature conditions which will result in a maximum removal of water from the juice when the juice has its maximum water content.

Since the juice at a low temperature is vigorously agitated, the formation of white ice will be largely eliminated. By closely regulating the conditions of temperature and the stirring of the juice as little as about one-tenth of one percent of the juice will be entrained within the ice crystals.

As indicated in Figure 1, the juice is maintained under a sub-atmospheric pressure or partial vacuum throughout the entire dehydration process. The partial vacuum atmosphere prevents to a large extent the entrainment of air within the ice crystals. Furthermore, any impurities in the atmosphere to which the juice is exposed are removed. The resultant dehydrated juice has a greater degree of purity than would be the case if a vacuum was not employed. In addition, processing the juice under vacuum will decrease oxidation of the juice. This results in elimination of contamination and bacteriological and enzyme action on the juice. Consequently, the resultant juice concentrate may be stored in packaged containers for long periods of time without spoiling.

The same result can be obtained by blanketing the tanks with nitrogen or other inert gases.

In addition, the partial vacuum atmosphere surrounding the juice considerably decreases the volatilization of aromatics from the juice.

When the juice has been exposed to a temperature of —30° F. for several minutes, the needle-like ice crystals formed therein are removed. This may be done by centrifuging the slushy mass of partially dehydrated juice and ice crystals. The separation of the juice from the ice crystals is greatly facilitated by the needle-like structure of the crystals since this structure prevents the ready passage of crystals through the fine perforations in the rotating basket of the centrifuging apparatus.

The centrifuged partially dehydrated juice or first concentrate is next subjected to freezing zone B which is maintained at a temperature of the order of —23° F. The increments at which the temperature is increased are substantially equal and are of the order of 7° F. The various zones through which the juice passes are maintained at the following illustrative temperatures:

| Zone | °F. |
|---|---|
| Zone A | —30 |
| Zone B | —23 |
| Zone C | —15 |
| Zone D | — 7 |
| Zone E | 0 |

After exposure to each freezing zone the partially dehydrated juice will be centrifuged to remove the ice crystals formed during that freezing zone and the juice with some ice crystals for seeding is subjected to the next freezing step.

As shown in Figure 2, the progressive increases in temperature cause a corresponding increase in the concentration of the juice, since an increasing amount of water is being continually removed. In addition, the increase in temperature will also result in a decrease in the size of the ice crystals formed. The decrease in size of the ice crystals is also due in part to the decrease in the amount of water present within the juice. The formation of the progressively decreasing size of ice crystals will ultimately result in fine ice crystals which will extract a sufficient amount of water throughout the freezing process to result in a juice concentrate having a Brix of about 70°. Since the dehydrated juice is discharged at about 0° F., the Brix of the juice concentrate will vary between 60 and 85°.

When the juice emerges from the final freezing zone E, it is in the form of a slushy mass comprising dehydrated juice and water in the form of ice crystals which has been extracted from the fresh juice. This slushy mass is again finally centrifuged to separate the juice from the ice crystals. The dehydrated juice concentrate is delivered directly to a mixing and storage tank.

The surplus ice crystals separated from the slushy mass is then subjected to a flash heating process to evaporate the ice. This process will dispose of the surplus ice without necessitating special equipment for this purpose. The flash heating of the ice crystals will result in a vapor comprising aqueous vapors and aromatics from the juice. Under ordinary conditions the aromatics comprise about a few tenths of 1% of the fresh juice. Consequently, in most instances it would not be feasible to capture the aromatics, but if they are collected they can be readily restored to the concentrate.

However, the aromatics may be separated from the aqueous vapors by any suitable process, as, for example, by utilizing the difference of vapor pressures between the aqueous vapors and the aromatics.

Since the juice has been maintained under a vacuum or a nitrogen blanket throughout its processing, there will be little volatilization of the aromatics from the juice. Consequently, the aromatics of the raw juice will be almost exclusively in the dehydrated juice and not in the ice crystals. By recapturing the aromatics from the vaporized ice and conducting the captured aromatics to the mixing tank, nothing will have been removed from the fresh juice except clear water. The dehydrated juice and the aromatics are then intermixed to form a juice concentrate which when reconstituted will have the original taste and other characteristics of the fresh juice.

During the flash heating process the pulp and other solids entrained in the ice crystals may be collected in the flash heater and intermixed with the dehydrated juice in order to maintain the juice at a predetermined concentration.

Thus it can be seen that the process described as this invention discloses a method of removing the maximum amount of water from a juice or the like within a short period of time. By carefully regulating the agitation of the juice when the juice is initially subjected to a low temperature, the resulting ice crystals will comprise pure water. The juice concentrate produced may be either shipped in frozen form under refrigeration or it can be packed or preserved without refrigeration if the concentration is at least 60° Brix. Moreover, by subjecting the fresh juice to irradiation and a vacuum in accordance with this invention, a juice concentrate is produced which is substantially free of citrus oil and any bacteria which would cause a rapid deterioration of the juice.

It will be appreciated from the foregoing description and flow sheet that the process is readily adapted for the treatment of various solutions containing water and solids and which are to be dehydrated and irradiated to produce a concentrated product. Further, it will be understood that sequence of the steps may be changed and the dehydration temperatures varied, depending upon the material being treated and the concentration of Brix desired for the final product.

It will be understood that this invention is susceptible to modification in order to adapt it to different usages and conditions, and, accordingly, it is desired to comprehend such modifications within this invention as may fall within the scope of the appended claims.

What is claimed is:

1. In a method of dehydrating citrus juices containing solids by freezing to extract water in the form of ice crystals from the presence of the solids, the steps of pre-cooling the citrus juice and abruptly subjecting the citrus juice to a temperature drop of the order of 60° F. from a temperature of about 32° F. for a period of several minutes to form ice crystals so as to extract water from the juice, agitating the juice during the freezing step, removing by centrifuging a portion of the ice crystals from the mixture of juice and ice crystals whereby the remaining juice forms a juice concentrate, progressively increasing the temperature to which the juice concentrate is subjected in predetermined increments until a temperature of 0° F. is obtained, centrifuging the ice crystals from the juice concentrate after each increase in temperature and after the temperature of the liquid has been increased to 0° F. to obtain a progressively concentrated juice concentrate.

2. In a method of concentrating citrus juices bearing solids by freezing to extract the water from the presence of the solids, the steps of suddenly and abruptly dropping the temperature of the citrus juice to a temperature of −30° F. and holding the citrus juice at this temperature only for several minutes so as not to freeze the citrus juice into a solid mass but to form maximum size ice crystals when there is maximum water content in the citrus juice, agitating the citrus juice during this initial freezing step, centrifuging the ice crystals from the mixture of citrus juice and ice crystals to decrease the water content of the citrus juice and to form a citrus juice concentrate, subjecting the resulting juice concentrate to a temperature of −23° F. for a period of time of several minutes and agitating the juice to freeze additional water from the citrus juice into smaller ice crystals than were formed in the freezing step of −30° F., centrifuging the smaller ice crystals from the mixture of citrus juice and ice crystals resulting after the freezing step of −23° F. to form a more concentrated citrus juice concentrate, and subjecting the more concentrated concentrate to a series of progressively higher temperatures by 7° increments accompanied by agitation and followed by centrifuging with the last freezing zone being about 0° F. to form progressively concentrated citrus juice concentrate.

3. In a method of concentrating citrus juices bearing solids by freezing to extract the water from the presence of the solids, the steps of markedly and abruptly subjecting the juice to a temperature of −30° F. to bring about thermal shock so as to form maximum size ice crystals when there is maximum water content in the liquid and holding the liquid at this temperature only for several minutes, agitating the liquid during freezing to prevent occlusion of the solids in the ice crystals, centrifuging the ice crystals from the mixture of juice and ice crystals to decrease the water content of the juice and to obtain a juice concentrate, maintaining the juice concentrate at a higher temperature than the thermal shock temperature but below the freezing point of the juice for a predetermined period of time of several minutes while agitating the juice to form smaller ice crystals so as to remove additional water from the juice, centrifuging the ice crystals from the mixture of juice concentrate and ice crystals resulting after the freezing step occurring at the higher temperature, and continuing the freezing and agitating steps at progressively higher temperatures and removing the ice after each freezing step until a juice concentrate of the desired concentration is obtained.

4. In a method of concentrating citrus juices bearing solids by freezing to extract water from the presence of the solids, the steps of markedly and abruptly reducing the temperature of the juice to −30° F. to form maximum size ice crystals when there is maximum water content within the juice and holding the juice at this temperature only for several minutes, agitating the juice during freezing, centrifuging the ice crystals from the mixture of juice and ice crystals to decrease the water content of the juice to obtain a juice concentrate, subjecting the juice concentrate to freezing zones at progressively higher temperatures below the freezing point of the juice and agitating to form ice crystals to remove additional water from the juice, and after each freezing step centrifuging the ice crystals formed in the freezing step to obtain progressively concentrated juice concentrates.

References Cited in the file of this patent

UNITED STATES PATENTS

| | | |
|---|---|---|
| 2,419,909 | Noyes | Apr. 29, 1947 |
| 2,503,695 | Webb et al. | Apr. 11, 1950 |
| 2,588,337 | Sperti | Mar. 11, 1952 |
| 2,800,001 | Wenzelberger | July 23, 1957 |